US007313403B2

(12) United States Patent
Gong et al.

(10) Patent No.: US 7,313,403 B2
(45) Date of Patent: Dec. 25, 2007

(54) LOCATION POSITIONING IN WIRELESS NETWORKS

(75) Inventors: Yi Gong, Nanjing (CN); Hang Ching Jason Leung, Yuen Long (HK); Mario Joa-Ng, Ma On Shan (HK); Piu Bill Wong, Causeway Bay (HK); Soung Chang Liew, Shatin (HK); Yan Wang, Clear Water Bay (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 506 days.

(21) Appl. No.: 10/635,367

(22) Filed: Aug. 6, 2003

(65) Prior Publication Data

US 2005/0032531 A1    Feb. 10, 2005

(51) Int. Cl.
*H04Q 7/20*    (2006.01)
(52) U.S. Cl. .............................. 455/456.1; 455/404.2; 455/456.5; 455/440
(58) Field of Classification Search ............. 455/562.1, 455/101, 115.1, 456.1, 404.2, 456.5, 456.2, 455/440; 342/374
See application file for complete search history.

(56) References Cited

U.S. PATENT DOCUMENTS

| 5,355,520 | A |   | 10/1994 | Freeburg et al. |         |
|-----------|---|---|---------|-----------------|---------|
| 5,548,814 | A |   | 8/1996  | Lorang et al.   |         |
| 5,564,121 | A |   | 10/1996 | Chow et al.     |         |
| 5,581,260 | A | * | 12/1996 | Newman .......... | 342/374 |
| 5,613,205 | A | * | 3/1997  | Dufour .......... | 455/440 |
| 6,148,211 | A | * | 11/2000 | Reed et al. ..... | 455/456.2 |
| 6,195,556 | B1 |  | 2/2001  | Reudink et al.  |         |
| 6,236,849 | B1 | * | 5/2001 | Reudink et al. ..... | 455/342 |
| 6,246,861 | B1 | * | 6/2001 | Messier et al. ..... | 455/12.1 |

(Continued)

FOREIGN PATENT DOCUMENTS

| JP | 7074685 A | 3/1995 |
| JP | 9321679 A | 12/1997 |

OTHER PUBLICATIONS

International Search Report issued for PCT/CN2004/000909, dated Dec. 9, 2004.

(Continued)

*Primary Examiner*—Duc M. Nguyen
*Assistant Examiner*—Wayne Cai
(74) *Attorney, Agent, or Firm*—Fulbright & Jaworski LLP (57) ABSTRACT

Disclosed are systems and methods which provide for location positioning in wireless networks using techniques which are adapted to provide reliable location determinations even in complex topological environments. Embodiments utilize multiple antenna patterns, such as may be provided using phased array antennas, and implement location positioning techniques which do not require alteration of remote stations in providing location positioning. Various techniques for determining location may be implemented, including a channel model independent approach, a channel model based approach, or combinations thereof. A channel model independent approach used in providing location positioning may compare receive signal strength differences to an antenna gain difference table to determine an angle in the azimuth that a remote station is located. A channel model based approach used in providing location positioning may compare receive signal strength measurements to a database of signal strengths created using a wireless channel model.

96 Claims, 2 Drawing Sheets

U.S. PATENT DOCUMENTS

| | | |
|---|---|---|
| 6,405,018 B1 | 6/2002 | Reudink et al. |
| 6,771,966 B1* | 8/2004 | Chow .......................... 455/446 |
| 6,839,560 B1* | 1/2005 | Bahl et al. ............... 455/456.1 |
| 6,865,395 B2* | 3/2005 | Riley ...................... 455/456.1 |
| 2004/0203539 A1* | 10/2004 | Benes et al. ................ 455/101 |

OTHER PUBLICATIONS

Jason et al., U.S. Appl. No. 10/274,834, entitled: "Systems and Methods for Managing Wireless Communications Using Link Space Information," filed Oct. 21, 2002.

* cited by examiner

LOCATION POSITIONING IN WIRELESS NETWORKS

CROSS-REFERENCE TO RELATED APPLICATIONS

The present invention is related to co-pending and commonly assigned U.S. patent application Ser. No. 10/274,834 entitled "Systems and Methods for Managing Wireless Communications Using Link Space Information," filed Oct. 21, 2002, the disclosure of which is hereby incorporated herein by reference.

TECHNICAL FIELD

The present invention is directed toward wireless communications and, more particularly, to location positioning of wireless devices.

BACKGROUND OF THE INVENTION

It is sometimes desirable to locate the position of a station operable within a wireless, e.g., radio frequency (RF), network. For example, the United States Federal Communications Commission (FCC) has decreed that cellular telephone systems must implement systems to provide mobile telephone position information for use in emergency response, e.g., enhanced 911 (E911) emergency response. Additionally, the use of global positioning system (GPS) receivers, which operate in conjunction with a network of middle earth orbit satellites orbiting the Earth to determine the receiver's position, has almost become ubiquitous in navigational applications.

In order to estimate a station's location, a system typically measures a metric that is a function of distance. The measured metric is often signal strength, which decays logarithmically with distance in free space. Time information, such as time of arrival of a signal or time difference of arrival of a signal at diverse antennas, may be utilized as a measured metric from which distance information may be determined. Typically, several reference points are used with distance information derived from the measured metric in estimating location.

In the aforementioned GPS network, for example, the reference points are the satellites and the measured metric is the time of arrival of the satellite signal to the GPS receiver. The time of arrival of the satellite signal is typically directly proportional to the distance between the satellite and the GPS receiver due to a clear line of sight between the GPS receiver and satellite. By measuring the time of arrival associated with three satellites, a GPS receiver can calculate the longitude and latitude of the GPS receiver. By using time of arrival information with respect to a fourth satellites, a GPS receiver can also determine altitude.

In the aforementioned cellular networks, techniques including signal strength measurements and/or time difference of arrival have been implemented for location determination. For example, U.S. Pat. No. 6,195,556, the disclosure of which is incorporated herein by reference, teaches the use of signal strength measurements in combination with the time difference of arrival of a station's signal in determining the location of the station. Additionally, U.S. Pat. No. 6,195,556 teaches the use of mapping of received signal characteristics associated with particular positions (e.g., receive "signature" associated with each of a plurality of remote station locations) for use in determining a station's location. In the case of the aforementioned cellular network the base transceiver stations (BTSs) are generally relied upon as the reference points from which distance determinations are made.

Wireless local area network (WLAN) location determination systems have been implemented by capturing or mapping the fingerprint (e.g., signal strength, multipath characteristics, etcetera) of wireless access points (APs) at particular points in the service area. These location fingerprints are measured off-line, such as when a network is being deployed, and are stored in a database for later comparison to the wireless signal environment as experienced by a remote station. By comparing the measured fingerprint at the current location of a remote station to the entries in the database, a nearest match may be returned as the estimated location.

The above techniques for determining station location have numerous disadvantages associated therewith. For example, the time of arrival techniques of the aforementioned GPS system rely upon highly complex and costly satellites, which include atomic clock mechanisms etcetera, to provide accurate time information. Furthermore, the proper operation of a GPS receiver requires clear line of sight to three satellites, which is often not possible in topologically complex environments, such as densely built out urban areas and indoor environments. It is well known that GPS receivers are not well suited for use indoors or even in the cabin of a boat or other vessel, unless the enclosure is constructed of suitable RF permeable material or the GPS receiver antenna is disposed external thereto. Of course, disposing the GPS receiver antenna externally may not be desirable as the location of the antenna and not the GPS receiver itself would be determined.

Topologically complex environments generally provide an environment in which the wireless channel is very noisy and wireless signals suffer from reflection, diffraction, and multipath effects. Such environments result in the received signal strength often no longer providing a direct correspondence to distance, although the attenuation of such a signal in free space is predictable with respect to propagation distance. For example, the signal strength, as measured by a network node, of signals from two stations disposed in such a topologically complex environment an equal distance from the network node, may appear to be a random value. That is, although the same transmit-receive distance to the node is present with respect to both such stations, the receive signal strength as measured by the node for each station may be substantially different due to the characteristics of wireless propagation channel.

The aforementioned mapping or fingerprinting techniques utilized with respect to WLANs may generally be relied upon to address variations in wireless propagation. However, the time and expense involved in setting up such a fingerprint database is typically significant. Moreover, implementation of such a technique involves the modification and cooperation of the remote stations for the measurement and comparison of such data.

BRIEF SUMMARY OF THE INVENTION

The present invention is directed to systems and methods which provide for location positioning in wireless networks, such as WLANs, wireless metropolitan area networks (WMANs), cellular networks, RF point-to-multipoint broadband networks, satellite communication networks, etcetera, using techniques which are adapted to provide reliable location determinations even in complex topological environments, including indoor environments and densely built out metropolitan environments. Preferred embodiments of the present invention utilize multiple antenna patterns, such as may be provided using phased array antennas, in providing location positioning. Location positioning systems according to embodiments of the present invention are particularly well suited for complex topological environments, such as indoor environments, where traditional techniques, such as GPS, fail to work or require specialized hardware.

Embodiments of the present invention implement location positioning techniques which do not require alteration of remote stations, e.g., personal computers (PCs) (including laptop and notebook computers), personal digital assistants (PDAs), cellular telephones, vehicles, electronic equipment, etcetera, and/or which do not require the deployment of specialized or additional hardware components. Further, embodiments of the present invention provide for location positioning without the need for pre-deployment measurement link attributes mapping with respect to particular positions.

According to an embodiment of the present invention, a location determination/tracking system locates wireless PDAs, laptops, and other 802.11-enabled devices in an 802.11 WLAN. Such a determination/tracking system preferably utilizes the popular 802.11 WLAN and commercially available infrastructure to determine the user location without requiring extra hardware to be deployed for location positioning. Moreover, preferred embodiments of such a determination/tracking system do not require alteration or special programming of the aforementioned wireless PDAs, laptops, and other 802.11-enabled devices.

For example, embodiments of the present invention may utilize wireless fidelity (Wi-Fi) infrastructure in which access points (APs) are provided with phased array antennas, such as 2.4 GHz Wi-Fi switches available from Vivato, Inc., San Francisco, Calif. Logic coupled to the wireless network, such as disposed in a node, server, or other system thereof or deployed as a processor based system (e.g., personal computer) coupled thereto, may operate to analyze metrics, such as link attributes or other metrics associated with multiple antenna patterns, available from APs of the network to determine remote system location. Such logic, and the aforementioned location determinations, may be implemented without the alteration or cooperation of the remote systems.

Various techniques for determining location may be implemented according to the present invention. Embodiments of the present invention utilize a channel model independent approach (e.g., a direction approach), a channel model based approach (e.g., a signal strength signature approach), or combinations thereof in providing location positioning.

For example, an embodiment of the present invention utilizes a channel model independent approach in providing location positioning in which receive signal strength differences, of a signal associated with a remote station as received using multiple antenna patterns, are compared to an antenna gain difference table to determine an angle in the azimuth that a remote station is located with respect to an AP. A location determination with respect to the remote station may be made by knowing the angle between the remote station and APs in the network. Additionally or alternatively, a location determination with respect to the remote station may be made through use of a "best match" of the receive signal strength differences and the antenna gain differences of multiple APs.

An embodiment of the present invention utilizes a channel model based approach in providing location positioning in which a generic indoor wireless channel model is used to create a database that contains signal strength information associated with particular locations under each of multiple antenna patterns. Received signal strength information with respect to a remote station may be collected by one or more AP and utilized to compare with entries in the database for a closest match. The location information associated with a closet match or matches may be used in a location estimate. For example, a location determination with respect to the remote station may be made through use of a "best match" of the receive signal strength signature of multiple APs.

It should be appreciated that location positioning provided according to the present invention may be utilized in a number of applications. For example, embodiments of the present invention may be implemented to determine locations for location-sensitive content delivery, direction finding, person and/or asset tracking, emergency notification, network security, network resource management and/or allocation, etcetera.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
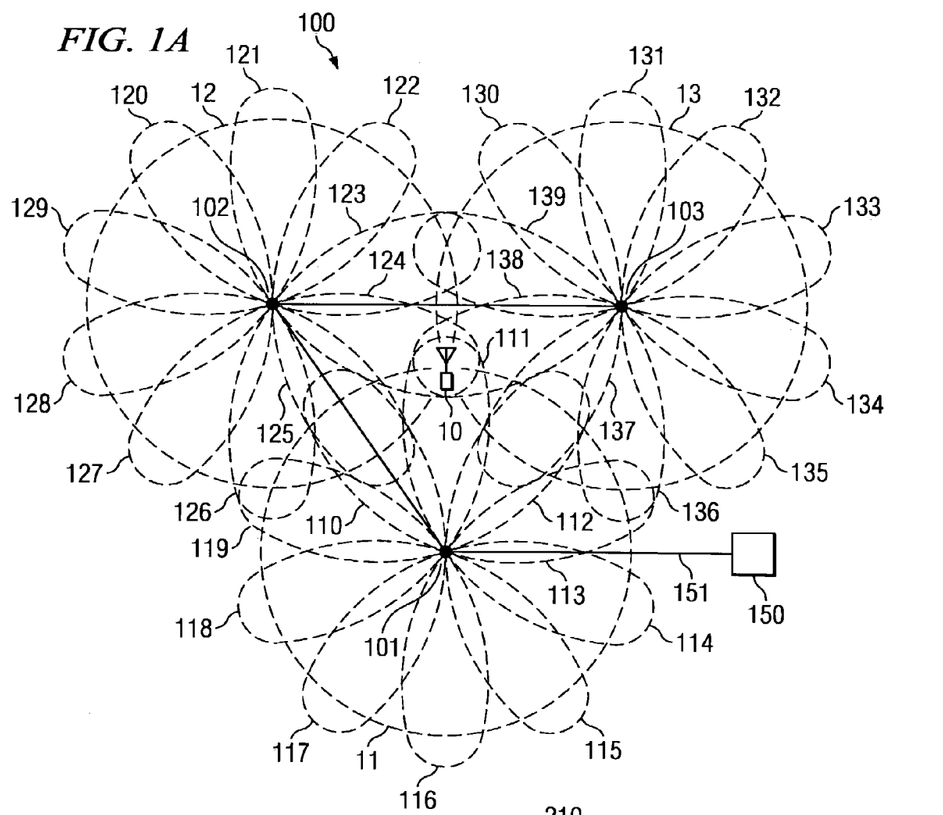
FIG. 1A shows a wireless network system into which embodiments of the present invention may be deployed.

Directing attention to FIG. 1A, an exemplary wireless network system is shown as network 100. It should be appreciated that network 100 may comprise a portion of a WLAN, WMAN, cellular network, satellite network, and/or the like. However, to better aid the reader in understanding the concepts of the present invention, reference herein shall be made to an embodiment wherein network 100 comprises a portion of a WLAN or WMAN and, therefore, terminology consistent with such a wireless network is used. It will readily be understood by one of skill in the art that the relevant wireless network aspects discussed herein have corresponding structure in other wireless network configurations and, therefore, implementation of the present invention with respect to such other wireless network configurations will readily be understood from the disclosure herein. For example, wireless access nodes are present in each of the foregoing wireless networks, although perhaps referenced using a different lexicon (e.g., access point (WLAN and WMAN), base transceiver station (cellular network), and transceiver (satellite network)).

In the embodiment illustrated in FIG. 1A, network backbone 151, such as may comprise wireline links, optic links, and/or wireless links, couples nodes of network 100. Specifically, processor-based system 150, such as may comprise a network server, a network workstation, a location positioning system, or even another network, e.g., the Internet, is shown coupled to APs 101-103 via network backbone 151. According to a preferred embodiment, network backbone 151 provides data communication according to a standard protocol, such as Ethernet, SONET, or the like, although proprietary protocols may be utilized if desired.

APs 101-103 of the illustrated embodiment provide RF illumination of a service area using multiple antenna patterns. For example, APs 101-103 may implement smart antenna configurations employing phased arrays and/or antenna beam switching to provide multiple antenna patterns. Commercially available APs adapted to provide multiple antenna patterns include the 2.4 GHz Wi-Fi switches available from Vivato, Inc., San Francisco, Calif.

The illustrated embodiment shows a configuration in which each AP has 10 approximately 36° directional antenna patterns and one omni-directional (approximately 360°) antenna pattern associated therewith. Specifically, AP 101 has directional antenna patterns 110-119 and omni-directional antenna pattern 11 associated therewith. Similarly, AP 102 has directional antenna patterns 120-129 and omni-directional antenna pattern 12 associated therewith and AP 103 has directional antenna patterns 130-139 and omni-directional antenna pattern 13 associated therewith.

It should be appreciated that the directional antenna patterns of the illustrated embodiment are disposed to provide wave fronts along different azimuthal angles, thereby providing directional coverage throughout a portion of the service area around each corresponding AP. However, it should also be appreciated that operation of the present invention is not limited to the particular antenna pattern configuration represented in FIG. 1A. For example, an AP may be configured to provide coverage in less than a 360° radius about the AP.

Figure 2A:
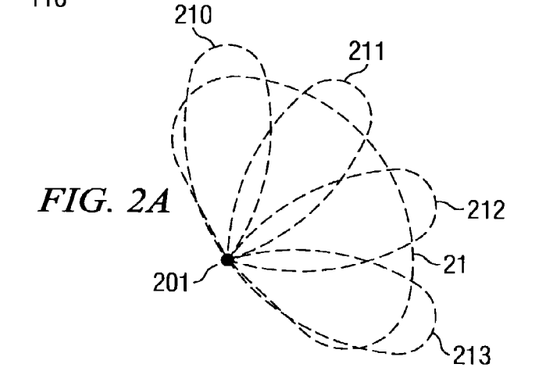
FIGS. 2A and 2B show various multiple antenna pattern configurations as may be utilized according to embodiments of the present invention.

As shown in FIG. 2A, an AP might be configured to provide a relatively wide antenna pattern covering a desired area, or portion thereof, and multiple more narrow antenna patterns within that area. In the example of FIG. 2A, AP 201 is configured to provide wide antenna pattern 21, such as may comprise an approximately 120° beam, and narrow antenna patterns 210-213, such as may comprise approximately 30° beams. AP 201 is not limited to providing illumination of the area shown and might, for example, implement 2 additional such multiple antenna pattern configurations centered at different azimuthal angles, to thereby provide 360° illumination.

Figure 2B:
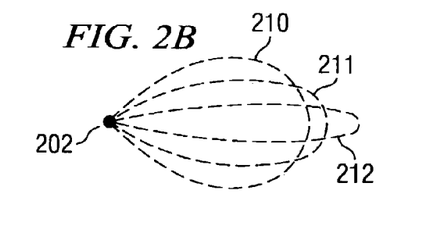

As shown in FIG. 2B, an AP might be configured to provide multiple overlapping directional antenna patterns centered at a same azimuthal angle. Specifically, relatively wide antenna pattern 210, such as may comprise an approximately 60° beam, more narrow antenna pattern 211, such as may comprise an approximately 36° beam, and narrow antenna pattern 212, such as may comprise an approximately 5°, are each centered at a same azimuthal angle with respect to AP 202. As with AP 201 discussed above, AP 202 may implement additional such multiple antenna pattern configurations centered at different azimuthal angles, to thereby provide desired illumination.

Irrespective of the particular antenna patterns implemented, the APs provide information communication links with respect to remote stations disposed within the service area of the wireless network. Referring again to FIG. 1A, remote station 10 is shown disposed in antenna patterns 11 and 111 of AP 101, antenna patterns 12 and 124 of AP 102, and antenna patterns 13 and 138 of AP 103. Any of APs 101-103 may be invoked to provide a wireless link with remote station 10, thereby facilitating network communication via network backbone 151 with respect to remote station 10.

Figure 1B:
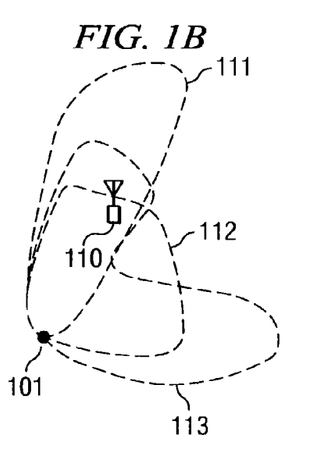
FIG. 1B show antenna patterns of FIG. 1A having gain components in a wide azimuthal range as may be present in an actual deployment.

It should be appreciated that the antenna patterns illustrated in FIG. 1A are highly simplified in order to more clearly convey the concepts of the present invention. For example, rather than providing the highly directional, clearly defined beams of FIG. 1A, APs may provide patterns which have gain components throughout a relatively wide azimuthal range. Directing attention to FIG. 1B, radiation patterns 111-113 of AP 101 having a relatively wide azimuthal range of antenna gain components are shown, as might be experienced in an actual deployment. Accordingly, one of skill in the art will readily appreciate that a remote station may be disposed in areas outside of where the radiation patterns of various APs are illustrated to be overlapping and yet still be in wireless communication therewith. Such gain components associated with a number of antenna patterns in a direction of a particular remote station enhances the ability to accurately determine positions according to embodiments of the present invention.

Embodiments of the present invention utilize the multiple antenna pattern aspect of one or more AP(s) in providing location positioning. Various techniques for determining location may be implemented according to the present invention. Embodiments of the present invention utilize a channel model independent approach, a channel model based approach, or combinations thereof in providing location positioning.

A channel model independent approach to determining remote station position according to embodiments of the present invention reduces the effects associated with a complex topology environment by utilizing the aforementioned multiple radiation patterns. It is expected that the wireless propagation effects associated with a particular location will be the same or substantially the same under different antenna patterns. For example, transmission/reception at a same azimuth angle for different antenna patterns will be subject to similar wireless propagation properties associated with a particular remote station location. By calculating the difference between received signal strengths of multiple antenna patterns, the effects of the variations in the wireless channel are reduced, and at the same time the effects due to propagation loss in the environment and transmit power variation among remote station are mitigated. As the gain signature on the multiple antenna pattern enabled access nodes will be different at different azimuth angles, the set of gain differences between patterns are also different for different angles. Therefore, by comparing the received signal strength differences to the antenna pattern gain differences, embodiments of the present invention are able to reveal direction information (e.g., azimuthal angle) between wireless devices (e.g., an access node and remote station). Accordingly, differences between received signal strengths for multiple patterns of a particular AP should reveal the direction of the remote station with respect to the AP. Preferred embodiment position determinations using a channel model independent approach utilize this information in implementing a position determination technique.

Figure 3:
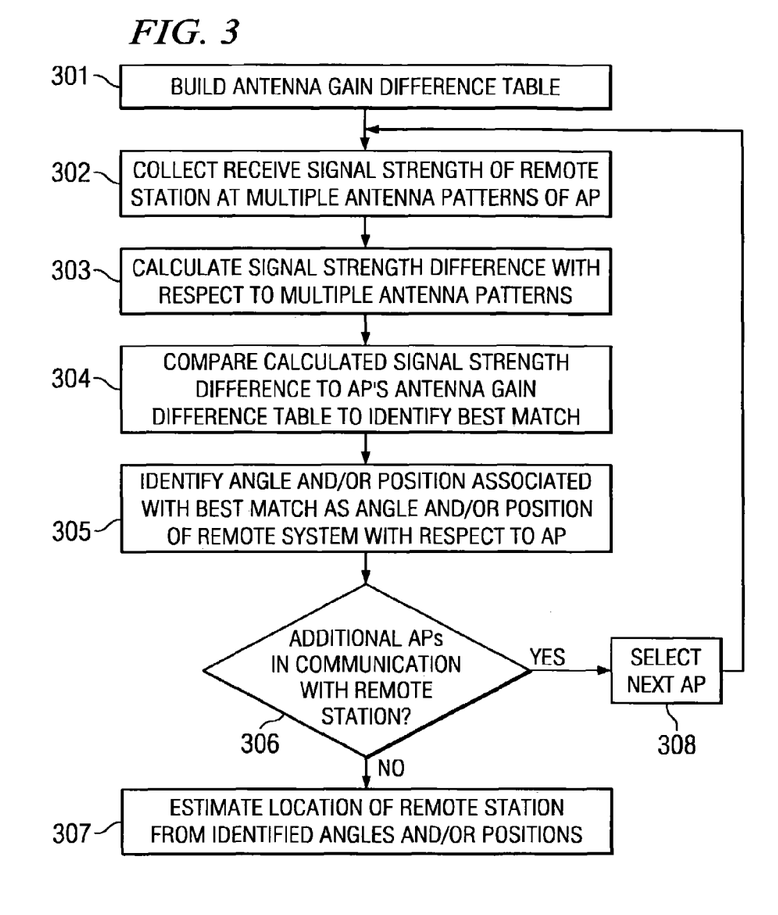
FIG. 3 shows a flow diagram setting forth steps of a preferred embodiment algorithm for implementing a channel model independent approach to location determination.

Directing attention to FIG. 3, a flow diagram setting forth steps of a preferred embodiment algorithm for implementing a channel model independent approach to location determination in which the aforementioned direction information is used is shown. The algorithm of FIG. 3 may be implemented by a processor-based system operable under control of a set of instructions defining operation as described herein. For example, a computer system having a central processing unit, such as a processor from the Intel PENTIUM family of processors, memory, such as RAM, ROM, and/or disk storage, and suitable input/output capabilities, such as a network interface, may be utilized in implementing the steps shown in FIG. 3. Such a processor-based system may be comprised of one or more of APs 101-103 and/or processor-based system 150 shown in FIG. 1A. For example, embodiments of the present invention may utilize a centralized system operable to perform the steps of FIG. 3 with respect to a plurality of APs for location determination. Additionally or alternatively, embodiments of the present invention may utilize distributed systems, preferably with some communication capability therebetween, to perform the steps of FIG. 3 with respect to one or a subset of APs for location determination.

Step 301 of the embodiment illustrated in FIG. 3 builds an antenna gain difference table (or database) including antenna gain difference information entries for each AP having multiple antenna patterns associated therewith. The differences are preferably calculated in logarithmic scale (e.g., in dB) where the magnitudes are subtracted to provide the aforementioned antenna gain differences. However, other techniques for determining the relative magnitude of two powers, or the antenna gain differences, may be used according to embodiments of the present invention. For example, in linear scale (e.g., in Watts) the operation is equivalent to the normalization (division) between different pairs of antenna patterns.

A preferred embodiment of the present invention utilizes the gain of a selected AP antenna pattern, such as an omni-directional antenna pattern, as a base line for comparison with the gain of other ones of the AP antenna patterns, such as directional antenna patterns. In the example of FIG. 1A, in building antenna gain difference table entries for AP 101, the antenna gain difference at each of a plurality of azimuthal angles between each of antenna pattern 110 and antenna pattern 11, antenna pattern 111 and antenna pattern 11, antenna pattern 112 and antenna pattern 11, antenna pattern 113 and antenna pattern 11, antenna pattern 114 and antenna pattern 11, antenna pattern 115 and antenna pattern 11, antenna pattern 116 and antenna pattern 11, antenna pattern 117 and antenna pattern 11, antenna pattern 118 and antenna pattern 11, and antenna pattern 119 and antenna pattern 11 may be calculated to provide 10 antenna gain difference entries associated with AP 101.

For example, an antenna gain difference set associated with the azimuthal angle 0° may be calculated which includes the antenna gain difference between the gain of antenna pattern 110 at 0° and the gain of antenna pattern 11 at 0°, the gain of antenna pattern 111 at 0° and the gain of antenna pattern 111 at 0°, and so on through the gain of antenna pattern 119 at 0° and the gain of antenna pattern 11 at 0°. Likewise, an antenna gain difference set associated with the azimuthal angle 1° may be calculated which includes the antenna gain difference between the gain of antenna pattern 110 at 1° and the gain of antenna pattern 11 at 1°, the gain of antenna pattern 111 at 1° and the gain of antenna pattern 11 at 1°, and so on through the gain of antenna pattern 119 at 1° and the gain of antenna pattern 11 at 1°. Such calculations may be made with respect to each azimuth angle through 360°. Similar calculations are preferably made with respect to other multiple antenna pattern APs, such as APs 102 and 103.

Embodiments of the present invention may utilize additional or alternative antenna gain difference calculations to provide antenna gain differences useful for determining a direction and/or position of a remote station. For example, embodiments of the invention may utilize antenna pattern gain differences in addition to those calculated above to provide a more robust data set suitable for providing accurate and reliable direction determinations. Embodiments of the present invention may, for example, further calculate an antenna gain difference between each antenna pattern of an AP with respect to the desired azimuthal angles. In such an embodiment, the antenna gain difference at 0° between antenna pattern 110 and each of antenna patterns 111-119 may be calculated, etcetera. Again, similar calculations, when implemented, are preferably made with respect to other multiple antenna pattern APs, such as APs 102 and 103.

It should be appreciated that antenna gain differences may additionally or alternatively be calculated with respect to different combinations of antenna patterns, and therefore are not limited to use with respect to any particular combination of antenna patterns. However, the particular combination of antenna patterns and the particular operation (subtraction, division, or other antenna pattern difference determination technique) for determining the relative magnitude of two powers utilized in calculating antenna gain differences in step 301 are also preferably utilized in determining receive signal strength differences, as discussed below with respect to step 303.

The antenna gain differences stored in the aforementioned antenna gain difference table or tables may be indexed or otherwise stored in sets associated with a particular direction. For example, the antenna gain differences calculated with respect to the antenna patterns may be stored in association with a corresponding azimuthal angle (direction from AP 101). According to one embodiment, such antenna gain differences are calculated for angle increments of 1° from 0° to 360°. Of course, other angular resolutions may be utilized as desired, such as depending upon the size of the area illuminated, the expected user density, the level of location resolution desired, etcetera.

Additionally or alternatively, the antenna gain differences stored in the aforementioned antenna gain difference table or tables may be indexed or otherwise stored in multiple AP antenna gain difference signature sets associated with a particular location. For example, the antenna gain differences calculated with respect to the antenna patterns of multiple APs may be stored in association with a corresponding position where directional vectors of the multiple APs associated with the antenna gain differences intersect. According to one embodiment, a service area is divided into a number of grids, e.g., 100 grids, wherein each such grid has associated therewith a table containing the antenna pattern differences for multiple APs for a plurality of grid points therein. By directly comparing received signal strength differences from multiple APs to the antenna gain difference table entries, as described hereinbelow, a best matched grid point may be returned as a remote station estimated location.

It should be appreciated that the antenna gains utilized in building the antenna gain difference table described above are known or knowable from the antenna and/or beam forming characteristics of the system. For example, a particular AP may be configured to provide particular antenna patterns, each of which will have a gain associated therewith which may be provided by the manufacturer or relatively easily determined using formulae well known to RF engineers. Similarly, a particular AP may be configured to utilize beam forming coefficients in providing desired antenna patterns, from which an associated gain may be determined using the aforementioned formulae. Accordingly, building an antenna gain difference table or tables according to embodiments of the present invention does not require any site measurement.

It should be appreciated that the antenna gain difference table or tables may be stored in any number of locations on the network. For example, where a centralized configuration for determining location is used, e.g., where a centralized processor-based system such as processor-based system 150 is utilized, to determine remote station location for each of a plurality of APs, a table or tables storing information with respect to the antenna gain differences of each such AP may be stored at or in communication with such a centralized processor-based system. However, were a distributed configuration for determining location is used, e.g., where diverse processor-based systems such as APs 101-103 and/or regionalized processor-based systems such as a plurality of processor-based system 150, are utilized to determine remote station location for network APs, a table or tables storing information with respect to the antenna gain differences of associated ones of the APs may be stored at or in communication with such distributed processor-based systems.

Building an antenna gain difference table or tables as provided by step 301 of FIG. 3 is preferably performed when a network is initially deployed and/or when its configuration is changed. For example, an antenna gain difference table may be modified when APs are added or removed from the network, when the antenna pattern configuration of an AP is changed, etcetera.

In determining the location of a remote station, an AP, such as AP 101 of FIG. 1A, of the illustrated embodiment will collect information with respect to the receive signal strength of the remote station signal as received using multiple antenna patterns, as shown in step 302. This information is preferably sent to a processor-based system performing the channel model independent approach algorithm. For example, where a centralized system is utilized for location determinations, such as processor-based system 150, this information may be communicated via network backbone 151 to the centralized system. However, it should be appreciated that distributed processing may be utilized, such as by each AP independently determining an azimuthal angle of a vector pointing from the AP to the remote station. Accordingly, the aforementioned receive signal strength information may be processed by the AP for location positioning, according to particular embodiments. In such a distributed configuration, communication is preferably provided between the distributed processor-based systems to facilitate sharing of direction information and determining a location of the remote station from the direction information.

The channel model independent approach algorithm of the illustrated embodiment preferably utilizes the receive signal strength information with respect to multiple antenna patterns of the AP to calculate signal strength differences, as shown in step 303. Preferably, receive signal strength differences are calculated with respect to each combination of antenna patterns for which antenna gain differences were calculated. For example, in the above described exemplary embodiment receive signal strength differences are calculated between receive signal strength as present in the omni-directional antenna pattern, antenna pattern 11, and the receive signal strength as present in each of the directional antenna patterns, antenna patterns 110-119. According to alternative embodiments of the present invention, receive signal strength differences may be calculated for subsets of the aforementioned combinations, if desired. However, such subsets should be selected carefully in order to maintain a desired level of accuracy and reliability with respect to location determination.

The signal strength differences calculated with respect to a particular AP are preferably compared to the antenna gain differences for that same AP to find a best matching antenna gain difference set, as shown in step 304. According to preferred embodiments, the signal strength differences calculated with respect to a single or a plurality of multiple antenna pattern APs are compared to the antenna gain differences of the table to find a best match of the multiple AP signal strength difference signature. A best match may be determined through a highest number of receive signal strength differences matching or closely matching corresponding antenna gain differences. Alternatively, a best match may be determined through a correlation function between the receive signal strength differences and corresponding antenna gain differences. Of course, other techniques for determining a best match may be employed, such as statistical analysis and/or use of weighted averages. The result of such a best match operation can reveal the direction and/or position information of the mobile device. For example, where a database containing information from a single AP is used, the best match may reveal direction information. However, where a database with antenna pattern gain differences signature across multiple APs is used, position (e.g., both distance and direction) information may be obtained from the best match operation.

As discussed above, antenna gain difference sets of the antenna gain difference table will preferably have an azimuthal direction associated therewith. For example, an antenna gain difference set may have the azimuthal angle 0° associated therewith, another antenna gain difference set may have the azimuthal angle 1° associated therewith, yet another antenna gain difference set may have the azimuthal angle 2° associated therewith, and so on. The best matching antenna gain difference set may be utilized to identify an azimuthal angle for the direction of the remote station from the AP, as shown in step 305.

It should be appreciated that, in determining a location of the remote station, information in addition to the direction from a particular AP the remote station is disposed may be desired. For example, the direction the remote station is disposed from a second AP may be utilized to determine position by determining the point of intersection of vectors originating at respective ones of the APs and extending in the identified direction. Additionally or alternatively, the aforementioned best match of the multiple AP signal strength difference signature, utilizing information with respect to multiple APs, may be relied upon to provide a location positioning determination directly from the signal strength difference signature.

Accordingly, the illustrated embodiment of the channel model independent approach algorithm determines if additional APs illuminate or are illuminated by the remote station's signal transmission (as shown in step 306), although perhaps not in data communication therewith. If additional APs illuminate or are illuminated by the remote station's signal, a next AP is selected and the operations of steps 302-305 repeated to determine a direction from that AP the remote station is disposed.

Although a remote station's position may be estimated using directions as determined by 2 APs and/or receive signal strength difference signatures associated with 2 APs, embodiments of the present invention operate to determine directions and/or receive signal strength differences with respect to more than 2 APs to provide a higher level of accuracy and/or reliability in location estimation.

Regardless of the particular number of APs for which direction information has been determined, embodiments of the present invention may estimate the remote station's location by performing a best match with position and/or determining the point of intersection of vectors originating at respective ones of the APs and extending in the identified direction, as shown in step 307. It should be appreciated such location determinations may be with reference to the APs used in the direction determinations rather than with reference to a fixed coordinate system. However, according to preferred embodiments of the present invention, the location of the APs utilized in direction determinations are known with reference to a fixed coordinate system, e.g., a site map, and therefore the location of a remote station may be estimated in such a fixed coordinate system.

In the above described embodiment of a channel model independent approach algorithm, the receive signal strength difference was used to build up a difference table. However, directly applying such a difference table may not provide desired accuracy in identifying an angle between the remote station and each AP or otherwise providing position information, and therefore may not provide desired accuracy in location determinations. In order to improve such estimation accuracy, embodiments of the present invention use a function of the receive signal strength difference, such as the receive signal strength difference raised to a particular power (e.g., squared or cubed), a logrithmetic function, etcetera, rather than the receive signal strength difference itself to distinguish different angles. The function values for a certain angle can be regarded as the angle signature, wherein two or more of such angle signatures can comprise a unique signature for any individual location.

As mentioned previously, embodiments of the present invention may implement additional or alternative approaches to location determination. For example, a channel model independent approach algorithm, such as that set forth in FIG. 3, may be utilized in combination with another technique for location positioning, such as a channel model based approach algorithm. The use of a combination of such techniques may be relied upon to provide more accurate and/or reliable location estimates and/or to provide confirmation of a location estimate.

Figure 4:
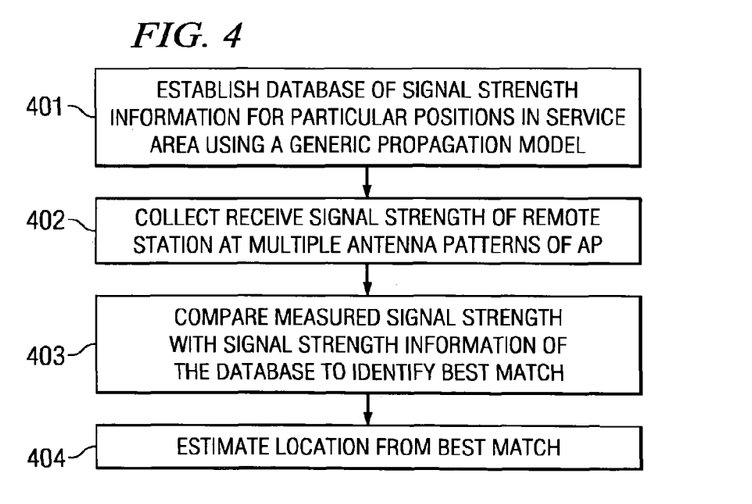
FIG. 4 shows a flow diagram setting forth steps of a preferred embodiment algorithm for implementing a channel model based approach to location determination.

Directing attention to FIG. 4, a flow diagram setting forth steps of a preferred embodiment algorithm for implementing a channel model based approach to location determination is shown. As with the foregoing algorithm, the algorithm of FIG. 4 may be implemented by a processor-based system operable under control of a set of instructions defining operation as described herein. For example, a computer system having a central processing unit, such as a processor from the Intel PENTIUM family of processors, memory, such as RAM, ROM, and/or disk storage, and suitable input/output capabilities may be utilized in implementing the steps shown in FIG. 4. Such a processor-based system may be comprised of one or more of APs 101-103 and/or processor-based system 150 shown in FIG. 1A. For example, embodiments of the present invention may utilize a centralized system operable to perform the steps of FIG. 4 with respect to a plurality of APs for location determination. Additionally or alternatively, embodiments of the present invention may utilize distributed systems, preferably with some communication capability therebetween, to perform the steps of FIG. 4 with respect to one or a subset of APs for location determination.

Step 401 of the embodiment illustrated in FIG. 4 creates or establishes a database (or table) of signal strength information using a propagation model (channel model), such as may comprise information with respect to shadowing, scattering, interference, etcetera. According to embodiments of the invention, the propagation model may be utilized to associate estimated distances to various receive signal strengths based upon the propagation conditions predicted by the propagation model. Additionally or alternatively, the propagation model may be utilized to associate particular positions in the service area with various receive signal strengths based upon the propagation conditions predicted by the propagation model.

A preferred embodiment utilizes a generic propagation model setting forth signal propagation characteristics which are generic to a number of sites. For example, although perhaps modeled for a particular type environment, such as a complex topology environment (e.g., a generic indoor wireless channel model), a propagation model utilized according to embodiments of the present invention may be generic to all such environments, and thus not specifically adapted for a particular service area or deployment. Alternatively, embodiments of the present invention may utilize a propagation model which is adapted for the particular service area or deployment, such as by including information with respect to structure, scatterers, etcetera, which may be disposed in the service area. Additionally or alternatively, such propagation models may be supplemented with empirical measurement information, such as from spot field testing and/or testing with respect to particularly severe topological structure. Irrespective of the particular propagation model utilized, propagation models utilized according to preferred embodiments of the present invention provide information useful in predicting the link conditions (modeling the link channel) which may be experienced within a service area.

The aforementioned signal strength information database may comprise a plurality of entries setting forth receive signal strength characteristics associated with remote station transmission from various distances from an AP as predicted using the propagation model. For example, using propagation characteristics simulated using the propagation model, received signal strengths associated with an imaginary remote station transmitting at various distances from an AP may be calculated.

Additionally or alternatively, the signal strength information database may comprise a plurality of entries setting forth receive signal strength characteristics associated with a remote station's signal transmitted from each of a plurality of particular positions for the multiple antenna patterns of an AP as predicted using the propagation model. For example, an imaginary grid or grids may be established to demarcate a number of positions within a service area, or portion thereof, which provides a desired level of resolution with respect to location estimation. The receive signal strength of an imaginary remote station as experienced by each antenna pattern of the multiple antenna patterns of an AP may be calculated (simulated) for each position demarcated by the grid. Additionally or alternatively, the receive signal strength of an imaginary remote station as experienced by each antenna pattern of a plurality of multiple antenna pattern APs may be calculated (simulated) for each position demarcated by the grid, thereby providing a multiple AP signal strength signature for each such position. Accordingly, sets of predicted receive signal strength data may be associated with particular positions, as may be defined by direction and distance information, by the signal strength information database.

It should be appreciated that the signal strength information database may be stored in any number of locations on the network. For example, where a centralized configuration for determining location is used, e.g., where a centralized processor-based system such as processor-based system 150 is utilized, to determine remote station location for each of a plurality of APs, a table or tables storing information with respect to the predicted receive signal strength for each such AP may be stored at or in communication with such a centralized processor-based system. However, were a distributed configuration for determining location is used, e.g., where diverse processor-based systems such as APs 101-103 and/or regionalized processor-based systems such as a plurality of processor-based system 150, are utilized to determine remote station location for network APs, a table or tables storing information with respect to the predicted receive signal strength associated ones of the APs may be stored at or in communication with such distributed processor-based systems.

It should be appreciated that, as a simulation approach is taken according to embodiments of the present invention, offline pre-deployment empirical measurements have been avoided. Accordingly, it is expected that implementation of such embodiments of the present invention will save time and expense over such techniques.

In determining the location of a remote station, an AP, such as AP 101 of FIG. 1A, of the illustrated embodiment will collect information with respect to the receive signal strength of the remote station signal as received using multiple antenna patterns; as shown in step 402. This information is preferably sent to a processor-based system performing the channel model based approach algorithm. For example, where a centralized system is utilized for location determinations, such as processor-based system 150, this information may be communicated via network backbone 151 to the centralized system. However, it should be appreciated that distributed processing may be utilized, such as by each AP independently determining a distance/position from the AP to the remote station. Accordingly, the aforementioned receive signal strength information may be processed by the AP for location positioning, according to particular embodiments. In such a distributed configuration, communication is preferably provided between the distributed processor-based systems to facilitate sharing of distance/position information and determining a location of the remote station from the distance/position information.

The receive signal strengths collected with respect to a particular AP may be compared to the signal strength information of the database for that same AP to find a best matching signal strength information set, as shown in step 403. For example, the receive signal strengths from multiple antenna patterns of a single AP at the current location may be compared to the signal strength information database of each grid of an area, and the best match can be utilized to return a grid position to estimate the remote station's location.

As discussed above, signal strength information sets of the signal strength information database will preferably have distance and/or position information associated therewith. For example, a particular signal strength information set may have a distance of 50 meters from the AP associated therewith. Additionally or alternatively, a particular signal strength information set may have a grid position, or perhaps distance and direction (e.g., 50 meters at 270° from the AP), associated therewith. Such information provided by the best matching signal strength information set is utilized to estimate the location of the remote station, as shown in step 404.

According to preferred embodiments, the receive signal strengths collected with respect to a single or a plurality of multiple antenna pattern APs are compared to the signal strength information of the database to find a best match of the multiple AP signal strength signature. A best match may be determined through a highest number of receive signal strengths for multiple antenna patterns matching or closely matching corresponding signal strength information for the multiple antenna patterns. Alternatively, a best match may be determined through a correlation function between the receive signal strength and corresponding signal strength information. Of course, other techniques for determining a best match may be employed, such as statistical analysis and/or use of weighted averages. The result of the best match operation can reveal the distance, direction and/or position information of the remote station. For example, where a database containing information from a single AP with single antenna pattern is used, the best match may reveal distance information. However, where a database with predicted received signal strength signature of multiple antenna patterns with single/multiple APs is used, the position (i.e., both distance and direction) information may be obtained from the best match operation.

Accordingly, embodiments of the channel model based approach algorithm may operate to determine if additional APs illuminate or are illuminated by the remote station's signal transmission (not shown), although perhaps not in data communication therewith. If additional APs illuminate or are-illuminated by the remote station's signal, a next AP may be selected and the operations of steps 402-403 repeated to determine a distance from that AP the remote station is disposed.

It should be appreciated that, a remote station's position may be estimated using distance information as may be determined using APs not equipped with multiple antenna patterns as discussed above. For example, a remote station's position may be estimated using distances as determined by 3 APs. However, embodiments of the present invention operate to determine distances with respect to more than 3 APs to provide a higher level of accuracy and/or reliability in location estimation.

As discussed above, multiple antenna patterns of APs utilized according to preferred embodiments of the invention provide information in addition to the distance from a particular AP the remote station is disposed, useful in determining a location of the remote station. Accordingly, embodiments of the present invention implement multiple antenna pattern configurations at the APs, thereby facilitating association of position information with the aforementioned signal strength information sets in the signal strength information database.

Embodiments of the present invention operate to estimate a remote station's position directly from the above best matching of receive signal strengths. The multiple antenna pattern receive signal strength best matching techniques described above facilitate use of a single AP in the location positioning of a remote station. However, multiple APs are utilized in such a channel model based approach algorithm according to embodiments of the invention to confirm the location estimate and/or to increase the reliability and/or accuracy of such an estimate, as described above. For example, it is expected that receive signal strength measurements from 2 APs using such a technique will provide a highly reliable and accurate location determination.

It should be appreciated such location determinations may be with reference to the APs used in the distance/position determinations rather than with reference to a fixed coordinate system. However, according to preferred embodiments of the present invention, the location of the APs utilized in distance/position determinations are known with reference to a fixed coordinate system, e.g., a site map, and therefore the location of a remote station may be estimated in such a fixed coordinate system.

As mentioned above, the above location determination techniques may be utilized alone or in combinations. Accordingly, particular techniques may be selected and implemented depending upon considerations as a desired level of position location resolution desired, a desired level of reliability in the location estimates made, the amount of processing power available and its configuration (e.g., centralized, distributed, etcetera), and/or the like.

Location positioning provided according to embodiments of the present invention may be utilized in any of a number of applications. For example, embodiments of the present invention may be implemented to determine locations for location-sensitive content delivery, direction finding, person and/or asset tracking, emergency notification, network security, network resource management and/or allocation, etcetera.

Recently the widespread popularity of WLANs has drawn attention to security issues associated with such infrastructure. In a wired network, every system, e.g., laptops and workstations, access the network through a designated port. The locations of these ports are known and may be controlled. Likewise, the systems which are authorized to utilize such ports are known and may be controlled. Accordingly, finding security breaches in such a system is relatively simple. However, in a typical WLAN it is very difficult to find security breaches. For example, without implementing station by station security measures, such as cryptography (which can be problematic to implement and maintain as well as often discouraging guest access to the WLAN), the broadcast nature of the wireless links makes identifying and blocking access to intruding systems, e.g., rogue APs and unauthorized remote stations, very difficult.

Embodiments of the present invention, however, may be relied upon to provide location determination/tracking techniques useful in meeting network security challenges. A feature particularly desirable for use with respect to network security applications provided according to embodiments of the present invention is that the cooperation of the devices, e.g., remote stations, whose locations are to be determined or tracked is not necessary. Specifically, no specialized hardware or software needs to be deployed at remote stations, APs, etcetera, in order to allow or prevent their use with techniques of the present invention. In contrast, the traditional approach often requires some client software to be installed at devices which are to be tracked. However, one would not expect a malicious user to voluntarily install such client software so that he/she can be tracked.

Intruder detection may be provided using embodiments of the present invention through identification of a remote station location which is not authorized, e.g., outside the perimeter of a served campus or within an area authorized WLAN access is not permitted or is otherwise not expected, such as a public lobby or a bathroom. An embodiment of the present invention may operate to identify the location of an unauthorized device or user in a WLAN environment and immediately alert the network administrator. Additionally or alternatively, an embodiment of the present invention may operate to close the breach, such as by changing the radiation pattern of AP phased array antennas and/or adjusting the transmit power of system APs to cause the intruder to be out of network coverage.

It should be appreciated that the above described security breach identification and mitigation techniques are not limited to use with respect to a particular type of rogue system, e.g., remote station. For example, the present invention may operate to identify the location of a rogue AP in a WLAN environment and control registered APs to change their coverage so as to force the rogue AP out of network coverage.

Moreover, the security aspects available through use of embodiments of the present invention are not limited to blocking all network access. For example, embodiments of the present invention may provide location-based access security, such that particular locations may be provided corresponding different levels of access. Accordingly, a remote station located in a client reception area may be given network access sufficient to allow public Internet access, but be prevented from otherwise accessing internal network systems and data. However, the same remote station located in a research and development lab of the same campus may be given access to particular project data and servers associated with that lab. Here the physical security of the premises may be relied upon, at least in part, for network security. Of course, traditional network security, such as user names and passwords, may be implemented in combination with the aforementioned location-based access security, if desired. For example, a particular user may be allowed to provide a user name and password to gain appropriate levels of network access even when the remote station used thereby is disposed in an otherwise limited access location, such as the aforementioned client reception area.

Similarly, embodiments of the present invention may provide for the delivery of the content based upon location determinations. For example, a remote station identified to be in a particular location may be provided information with respect to nearby restaurants and business or nearby attractions. Accordingly, operation of the present invention may be utilized to provide location sensitive content delivery, direction finding, showing maps on the PDAs of users, etcetera.

Application of location positioning according to the present invention is not limited to application with respect to network security or access. For example, embodiments of the present invention may be utilized in providing management of wireless communications and/or wireless communication system resources. Preferred embodiments of the present invention may be utilized in providing location information useful in developing accurate link space information for the management of wireless communications, such as shown and described in the above reference patent application entitled "Systems and Methods for Managing Wireless Communications Using Link Space Information."

Additionally or alternatively, embodiments of the present invention may be utilized to provide person/asset tracking and/or emergency notification. For example, expensive, yet portable, inventory, such as laptop computers and other electronic equipment, may be located, tracked, and/or inventoried automatically using embodiments of the present invention.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system comprising:
   a database containing antenna gain differences between multiple antenna patterns of a wireless network access node;
   calculation logic for determining receive signal strength differences of a signal, said signal received using said multiple antenna patterns, said signal being transmitted by a device disposed within one or more of said multiple antenna patterns;
   comparison logic for comparing said receive signal strength differences to said antenna gain differences and identifying a closest match
   a database containing predicted receive signal strength information for said multiple antenna patterns of said wireless network access node;
   measurement logic for measuring receive signal strengths of a signal received from said device using said multiple antenna patterns; and
   comparison logic for comparing said measured receive signal strengths to said predicted receive signal strength information and identifying a closest match, wherein said database containing predicted receive signal strength information further contains predicted receive signal strength information for multiple antenna patterns of a second wireless network access node, said measurement logic is further for measuring receive signal strengths of a signal received from said device using said multiple antenna patterns of said second wireless network access node, and said comparison logic is further for comparing said measured receive signal strengths of said second wireless network access node to said predicted receive signal strength information of said second wireless network access node and identifying a closest match.

2. The system of claim 1, wherein said database contains antenna gain differences between multiple narrow antenna patterns and a wide antenna pattern.

3. The system of claim 1, wherein said database contains antenna gain differences associated with each antenna pattern of said wireless network access node.

4. The system of claim 1, wherein said database associates ones of said antenna gain differences in antenna gain difference sets.

5. The system of claim 4, wherein each antenna gain difference set includes angle information.

6. The system of claim 5, wherein said angle information comprises an azimuthal angle of a vector pointing from said wireless network access node to said device.

7. The system of claim 4, wherein antenna gain difference sets include antenna gain differences of a plurality of wireless network access nodes.

8. The system of claim 7, wherein said antenna gain difference sets including antenna gain differences of a plurality of wireless network access nodes include position information.

9. The system of claim 1, wherein said database further contains antenna gain differences between multiple antenna patterns of a second wireless network access node, said calculation logic is further for determining receive signal strength differences of a signal received from said device using said multiple antenna patterns of said second wireless network access node, and said comparison logic is further for comparing said receive signal strength differences of said second wireless network access node to said antenna gain differences and identifying a closest match.

10. The system of claim 9, further comprising:
    location estimation logic for determining an estimated location of said device from an intersection point of vectors projected from said wireless network access node and said second wireless network access node.

11. The system of claim 9, further comprising:
    location estimation logic for determining an estimated location of said device from position information stored in association with said closest match of said antenna gain differences.

12. The system of claim 1, wherein said calculation logic and said comparison logic are disposed at a centralized system in communication with a plurality of wireless network access nodes.

13. The system of claim 1, wherein said calculation logic and said comparison logic are disposed in a distributed configuration.

14. The system of claim 13, wherein said calculation logic is disposed within said wireless network access node.

15. The system of claim 1, wherein said database containing predicted receive signal strength information associates predicted receive signal strength information in sets having a distance associated therewith.

16. The system of claim 1, wherein said database containing predicted receive signal strength information associates predicted receive signal strength information in sets having a position associated therewith.

17. The system of claim 1, wherein said predicted receive signal strength information is predicted using a generic propagation model.

18. The system of claim 1 wherein said predicted receive signal strength information includes predicted receive signal strength information of a plurality of wireless network access nodes.

19. The system of claim 1, further comprising:
    location estimation logic for determining an estimated location of said device from an intersection point of arcs projected identified distances from said wireless network access node and said second wireless network access node.

20. The system of claim 1, further comprising:
location estimation logic for determining an estimated location of said device from a midpoint of positions associated with said closest matches from said wireless network access node and said second wireless network access node.

21. The system of claim 1, further comprising:
location estimation logic for determining an estimated location of said device from position information stored in association with said closest match of said predicted receive signal strength information.

22. The system of claim 1, wherein said measurement logic and said comparison logic for comparing said measured receive signal strengths are disposed at a centralized system in communication with a plurality of wireless network access nodes.

23. The system of claim 1, wherein said measurement logic and said comparison logic for comparing said measured receive signal strengths are disposed in a distributed configuration.

24. The system of claim 23, wherein said measurement logic is disposed within said wireless network access node.

25. The system of claim 1, further comprising:
security logic for preventing access to a wireless network by said device as a function of said identified closest match.

26. The system of claim 1, further comprising:
location-based access security logic for providing levels of access to a wireless network by said device as a function of said identified closest match.

27. The system of claim 1, further comprising:
content delivery logic for providing content via a wireless network to said device as a function of said identified closest match.

28. The system of claim 1, further comprising:
management logic for providing management of at least one of wireless communications and wireless communication system resources as a function of said identified closest match.

29. The system of claim 1, further comprising:
asset tracking logic for providing at least one of asset tracking and asset inventorying automatically as a function of said identified closest match.

30. The system of claim 1, wherein said closest match is utilized in identifying a location of said device in a service area of a wireless network.

31. The system of claim 30, wherein said wireless network comprises a wireless local area network.

32. The system of claim 30, wherein said wireless network comprises a wireless metropolitan area network.

33. The system of claim 30, wherein said wireless network comprises a cellular network.

34. The system of claim 30, wherein said wireless network comprises a satellite network.

35. The system of claim 30, wherein said wireless network comprises a point-to-multipoint broadband network.

36. A system comprising:
a database containing predicted receive signal strength information for multiple antenna patterns of a wireless network access node;
measurement logic for measuring receive signal strengths of a signal received using said multiple antenna patterns, said signal being transmitted by a device disposed within one or more of said multiple antenna patterns;
comparison logic for comparing said measured receive signal strengths to said predicted receive signal strength information and identifying a closest match, wherein said database further contains predicted receive signal strength information for multiple antenna patterns of a second wireless network access node, said measurement logic is further for measuring receive signal strengths of a signal received from said device using said multiple antenna patterns of said second wireless network access node, and said comparison logic is further for comparing said measured receive signal strengths of said second wireless network access node to said predicted receive signal strength information of said second wireless network access node and identifying a closest match; and
location estimation logic for determining an estimated location of said device from an intersection point of arcs projected identified distances from said wireless network access node and said second wireless network access node.

37. The system of claim 36, wherein said database associates predicted receive signal strength information in sets of multiple antenna patterns having a distance associated therewith.

38. The system of claim 36, wherein said database associates predicted receive signal strength information in sets having a position associated therewith.

39. The system of claim 36, wherein said predicted receive signal strength information is predicted using a generic propagation model.

40. The system of claim 36, wherein said predicted receive signal strength information includes predicted receive signal strength information of a plurality of wireless network access nodes.

41. The system of claim 36, further comprising:
location estimation logic for determining an estimated location of said device from a midpoint of positions associated with said closest matches from said wireless network access node and said second wireless network access node.

42. The system of claim 36, further comprising:
location estimation logic for determining an estimated location of said device from position information stored in association with said closest match.

43. The system of claim 36, wherein said measurement logic and said comparison logic are disposed at a centralized system in communication with a plurality of wireless network access nodes.

44. The system of claim 36, wherein said measurement logic and said comparison logic are disposed in a distributed configuration.

45. The system of claim 44, wherein said measurement logic is disposed within said wireless network access node.

46. The system of claim 36, further comprising:
a database containing antenna gain differences between said multiple antenna patterns of said wireless network access node;
calculation logic for determining receive signal strength differences of a signal received from said device using said multiple antenna patterns; and
comparison logic for comparing said receive signal strength differences to said antenna gain differences and identifying a closest match.

47. The system of claim 46, wherein said database containing antenna gain differences associates ones of said antenna gain differences in antenna gain difference sets.

48. The system of claim 47, wherein said antenna gain difference sets include angle information.

49. The system of claim 47, wherein said antenna gain difference sets include position information.

50. The system of claim 47, wherein antenna gain difference sets include antenna gain differences of a plurality of wireless network access nodes.

51. The system of claim 50, wherein said antenna gain difference sets include position information.

52. The system of claim 46, wherein said database containing antenna gain differences further contains antenna gain differences between multiple antenna patterns of a second wireless network access node, said calculation logic is further for determining receive signal strength differences of a signal received from said device using said multiple antenna patterns of said second wireless network access node, and said comparison logic for comparing said receive signal strength differences is further for comparing said receive signal strength differences of said second wireless network access node to said antenna gain differences and identifying a closest match.

53. The system of claim 52, further comprising:
location estimation logic for determining an estimated location of said device from an intersection point of vectors projected from said wireless network access node and said second wireless network access node.

54. The system of claim 52, further comprising:
location estimation logic for determining an estimated location of said device from position information stored in association with said closest match of said antenna gain differences.

55. The system of claim 46, wherein said calculation logic and said comparison logic for comparing said receive signal strength differences are disposed at a centralized system in communication with a plurality of wireless network access nodes.

56. The system of claim 46, wherein said calculation logic and said comparison logic for comparing said receive signal strength differences are disposed in a distributed configuration.

57. The system of claim 56, wherein said calculation logic is disposed within said wireless network access node.

58. The system of claim 36, wherein said comparison logic is disposed at a centralized system in communication with a plurality of wireless network access nodes.

59. The system of claim 36, wherein said comparison logic is disposed in a distributed configuration.

60. The system of claim 36, further comprising:
security logic for preventing access to a wireless network by said device as a function of said identified closest match.

61. The system of claim 36, further comprising:
location-based access security logic for providing levels of access to a wireless network by said device as a function of said identified closest match.

62. The system of claim 36, further comprising:
content delivery logic for providing content via a wireless network to said device as a function of said identified closest match.

63. The system of claim 36, further comprising:
management logic for providing management of at least one of wireless communications and wireless communication system resources as a function of said identified closest match.

64. The system of claim 36, further comprising:
asset tracking logic for providing at least one of asset tracking and asset inventorying automatically as a function of said identified closest match.

65. The system of claim 36, wherein said closest match is utilized in identifying a location of said device in a service area of a wireless network.

66. The system of claim 65, wherein said wireless network comprises a wireless local area network.

67. The system of claim 65, wherein said wireless network comprises a wireless metropolitan area network.

68. The system of claim 65, wherein said wireless network comprises a cellular network.

69. The system of claim 65, wherein said wireless network comprises a satellite network.

70. The system of claim 65, wherein said wireless network comprises a point-to-multipoint broadband network.

71. A method for providing information useful in determining a position of a device within a wireless network, said method comprising:
calculating antenna gain differences between multiple antenna patterns of a wireless network access node;
determining receive signal strength differences of a signal, said signal received using said multiple antenna patterns, said signal being transmitted by a device disposed within one or more of said multiple antenna patterns;
comparing said receive signal strength differences to said antenna gain differences and identifying a closest match,
predicting receive signal strength information for said multiple antenna patterns of said wireless network access node;
comparing measured receive signal strengths of a signal received from said device using said multiple antenna patterns to said predicted receive signal strength information and identifying a closest match, wherein a database containing said predicted receive signal strength differences further contains predicted receive signal strength differences for multiple antenna patterns of a second wireless network access node;
measuring receive signal strengths of a signal received from said device using said multiple antenna patterns of said second wireless network access node;
comparing said measured receive signal strengths of said second wireless network access node to said predicted receive signal strength information of said second wireless network access node and identifying a closest match.

72. The method of claim 71, further comprising:
identifying a direction associated with said closest match.

73. The method of claim 72, further comprising:
estimating a position of said device as a function of said direction.

74. The method of claim 71, further comprising:
identifying a position stored in association with said closest match.

75. The method of claim 71, further comprising:
identifying a direction associated with said closest match of said antenna gain differences; and
identifying a distance associated with said closest match of said receive signal strengths.

76. The method of claim 75, further comprising:
estimating a position of said device as a function of said direction and said distance.

77. The method of claim 71, further comprising:
identifying a direction associated with said closest match of said antenna gain differences; and
identifying a position associated with said closest match of said receive signal strengths.

78. The method of claim 71, further comprising:
estimating a position of said device as a function of said closest match of said antenna gain differences; and
separately estimating a position of said device as a function of said closest match of said receive signal strengths.

79. The method of claim 78, wherein a one of said position estimates is used to confirm the other of said position estimates.

80. The method of claim 71, further comprising:
identifying a position associated with said closest match of said antenna gain differences;
identifying a position associated with said closest match of said receive signal strengths; and
estimating a position of said device as a function of said position associated with said antenna gain differences and said position associated with said receive signal strengths.

81. The method of claim 71, wherein said calculating antenna gain differences comprises:
calculating antenna gain differences between each of a plurality of narrow beam antenna patterns and a wide beam antenna pattern.

82. The method of claim 71, wherein said calculating antenna gain differences comprises:
calculating antenna gain differences for each antenna pattern combination in a set of antenna patterns.

83. The method of claim 71, further comprising:
providing network access as a function of said closest match.

84. The method of claim 71, further comprising:
providing data content as a function of said closest match.

85. The method of claim 71, further comprising:
providing management of network resources as a function of said closest match.

86. A method for providing information useful in determining a position of a device within a wireless network, said method comprising:
predicting receive signal strength information for multiple antenna patterns of a wireless network access node;
comparing measured receive signal strengths to said predicted receive signal strength information and identifying a closest match:
calculating antenna gain differences between said multiple antenna patterns of said wireless network access node;
determining receive signal strength differences of a signal received from said device using said multiple antenna patterns;
comparing said receive signal strength differences to said antenna gain differences and identifying a closest match;
estimating a position of said device as a function of said closest match of said antenna gain differences; and
separately estimating a position of said device as a function of said closest match of said receive signal strengths, wherein a one of said position estimates is used to confirm the other of said position estimates.

87. The method of claim 86, further comprising:
identifying a distance associated with said closest match.

88. The method of claim 87, further comprising:
estimating a position of said device as a function of said distance.

89. The method of claim 86, further comprising:
identifying a position associated with said closest match.

90. The method of claim 86, further comprising:
identifying a direction associated with said closest match of said antenna gain differences; and
identifying a distance associated with said closest match of said receive signal strengths.

91. The method of claim 90, further comprising:
estimating a position of said device as a function of said direction and said distance.

92. The method of claim 86, further comprising:
identifying a direction associated with said closest match of said antenna gain differences; and
identifying a position associated with said closest match of said receive signal strengths.

93. The method of claim 86, further comprising:
identifying a position associated with said closest match of said antenna gain differences;
identifying a position associated with said closest match of said receive signal strengths; and
estimating a position of said device as a function of said position from said antenna gain differences and said position from said receive signal strengths.

94. The method of claim 86, further comprising:
providing network access as a function of said closest match.

95. The method of claim 86, further comprising:
providing data content as a function of said closest match.

96. The method of claim 86, further comprising:
providing management of network resources as a function of said closest match.

* * * * *